United States Patent Office.

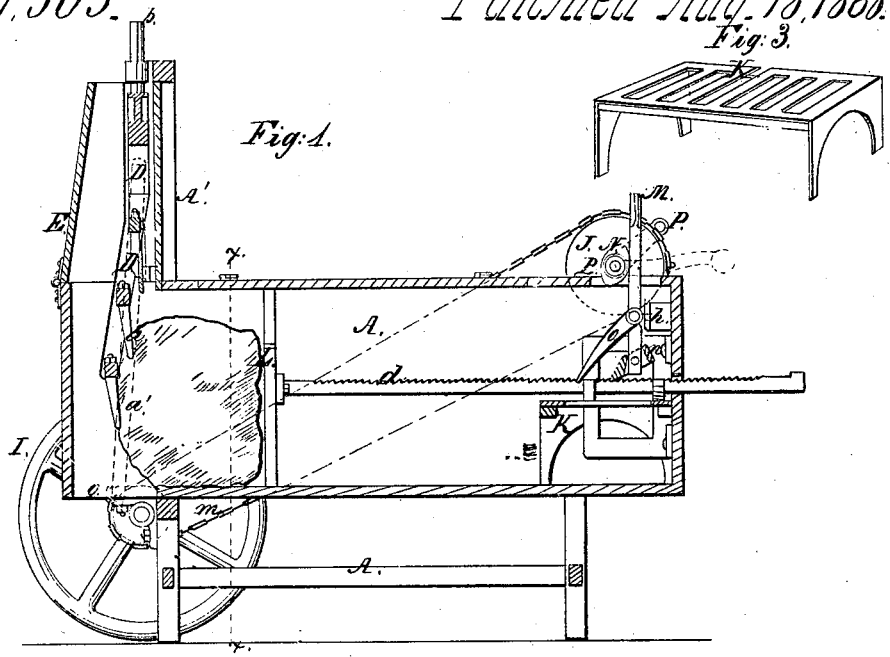
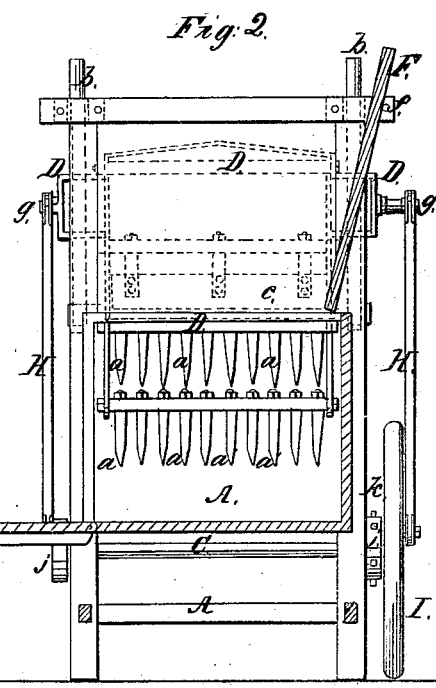

FRANZ G. SIEMERS, OF WINONA, MINNESOTA.

Letters Patent No. 81,303, dated August 18, 1868.

---

IMPROVED ICE-CUTTER.

---

The Schedule referred to in these Letters Patent and making part of the same.

---

TO ALL WHOM IT MAY CONCERN:

Be it known that I, FRANZ G. SIEMERS, of Winona, in the county of Winona, and State of Minnesota, have invented certain new and useful Improvement in Machines for Chopping Ice; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

Figure 1 is a longitudinal vertical section through the centre.

Figure 2 is a cross-section through the machine, on line $x\ x$ of fig. 1; and

Figure 3 is a perspective view of a portion detached.

My machine is designed for breaking up large blocks of ice into small pieces suitable for use in ice-cream freezers.

My machine consists of a strong frame, A, having mounted thereon a box, A', of suitable size and shape to receive the large blocks of ice that are to be chopped or broken up, this box being provided inside, at one end, with a series of vertically-reciprocating knives and pickers, to break said ice when brought beneath them.

It also further consists in a novel arrangement of mechanism for imparting motion, to said knives and pickers, and for feeding the ice up underneath them, all as hereinafter more fully described.

In the drawings, A' represents a long rectangular box, securely fastened in a strong frame, A, as shown in figs. 1 and 2.

Across the top of this box, near the rear end, I mount, in suitable bearings, a shaft, B. This shaft extends entirely across the machine, and has attached to one end a crank or pulley, by which to apply the motive-power, this crank being shown in red lines in fig. 1, and at the other end a sprocket-wheel, J.

Across, underneath the box A', near the front end, I mount another shaft, C, having an eccentric or crank on each end, and on the same side of the machine as that on which sprocket-wheel J is. I secure to this shaft C a sprocket-wheel, $j$, of less diameter than the wheel J', and also attach a fly or balance-wheel, I, as clearly shown in fig. 2. The wheel $j$, I drive from the wheel J by means of a sprocket-chain, $m$, as in fig. 1.

Directly above the shaft C there is stationed an iron frame, D, which plays up and down on the ways or guides $b\ b$, said guides being bolted to that portion of the frame A which extends above the box at the front end.

This metal frame has three or more horizontal cross-bars, to which are attached rows of pickers or teeth, $a\ a$ and $a'\ a'$, to crack or break the ice, and to the uppermost of these bars is attached a long blade or knife, $c$, extending the whole width of the box A'.

That portion of the frame to which the said cross-bars are secured stands inclined, so as to have each bar, from the top one down, stand a little forward of the one immediately above it, so that, as the frame itself moves vertically downward, each row of pickers, from the bottom one up, shall cut through the ice in a line further back than its predecessor.

The frame D, with its picks and knives, is operated by the pitmen H H, connected at their upper ends to the wrist-pins $g\ g$, on the frame, and at their lower ends to the cranks or eccentrics $j$, on the shaft C, which, when turned, will give to the frame a vertically-reciprocating movement, equal to the stroke of the eccentrics.

The picks or chisels are so adjusted that when the frame shall have completed its downward movement, the points of the lower row shall nearly touch the bottom of the box.

For the purpose of feeding the ice up to the knives, I place inside of the box a follower, L, having attached to it, on the back, a rack or ratchet-bar, $d$, which passes out through the back end of the box, as shown in fig. 1.

This bar I operate by a pawl, $n$, attached to a lever, M, which lever is pivoted, at $e$, to a stationary block, and is operated by a double cam, N, on shaft B, the lever being kept up against the cam by a suitable spring.

To prevent the bar from slipping back when the lever takes a stroke, I attach in front of the lever, but to the same pivot, a pawl, $o$, as shown in fig. 1, this pawl being of such a length that the pawl $n$ will not strike it when the lever is operated by the cam, but when the follower has travelled forward as far as desired, the upper end of lever M is thrown back until the pawl *n* is lifted out from the notches, and when, by continuing the movement, the end of pawl *n* will strike the under side of pawl *o*, and disengage that also, thus leaving the bar and follower free to be drawn back, and the machine refilled with ice.

The ice is introduced through the side or top, as desired, there being two hinged sides or doors, F and G, one on top and one on the side of the machine, they being shown open in fig. 2.

The side door, G, is hinged on its lower edge, and has pivoted to it, near its upper or outer edge, two bars, *e*, which, when the door is open, drop down, and form supports for the outer edge of the door, which thus stands horizontal, and serves as a table upon which to lay the ice previous to placing it in the machine.

The operation is as follows: The ice having been placed in the box, and the doors closed, the crank is turned, when the lever M, operated by the cam N, will, through the medium of the pawls *n* and *o*, force the follower L towards the knives, carrying the ice with it, the knives taking off at each stroke a portion from the end of the block of ice.

It will be observed that a layer is not cut square off from the ice at each stroke, but that the lower row of picks or chisels finishes a layer that was cut half way across by the upper knives at the previous stroke, as this is found much better in practice than a long stroke and a cut entirely across the block of ice.

The ice, after being cut off, falls through an opening, O, in the bottom of the box, into a proper receptacle placed below.

In the back end of the box I place a false bottom, formed of slats or bars, supported in a suitable frame, K. On these bars may be placed any articles which it is desired to keep cool, as the close proximity of the ice will do; in fact, the whole box may be used as a refrigerator when not employed breaking ice, as it is made very tight, and lined with zinc.

To protect the frame D from dirt and dust, and to prevent accidents, I provide a hinged shield, E, which shuts up over the frame, with its pickers, &c., but may be turned down when it is desired to gain access to the pickers for any purpose.

By the use of this machine, ice may be broken up with great rapidity, one man doing the work of several by the old process.

It is obvious that instead of both picks and knives being used, either may be used exclusively.

For the sake of convenience, I sometimes attach to the shaft B, on the back side of the machine, a crank, P, and connect with it one end of a bar, which is attached or connected with the cranks of several of my patent ice-cream freezers, said freezers being arranged in a row, along the back side of the ice-chopping machine, and thus, while turning the crank to operate the chopper, I will also operate several cream-freezers.

Having thus described my machine, what I claim, is—

1. The reciprocating frame D, having the series of pickers $a\ a'$ arranged to operate substantially as described.

2. In combination with the ice-cutting frame D, the follower L, arranged and operated substantially as described for feeding the ice to the pickers as it is cut.

3. The combined ice-cutter and refrigerator, when constructed and arranged for use, as shown and described.

FRANZ G. SIEMERS.

Witnesses:
 THOMAS SIMPSON,
 ABNER LEWIS.